(12) United States Patent
Rostami

(10) Patent No.: US 9,716,524 B2
(45) Date of Patent: Jul. 25, 2017

(54) SYSTEM, APPARATUS AND METHOD FOR GENERIC ELECTRONIC DEVICE POWER MODULE AND CASE FORMATION

(71) Applicant: Ramin Rostami, Calabasas, CA (US)

(72) Inventor: Ramin Rostami, Calabasas, CA (US)

( * ) Notice: Subject to any disclaimer, the term of this patent is extended or adjusted under 35 U.S.C. 154(b) by 0 days.

(21) Appl. No.: 14/910,405

(22) PCT Filed: Aug. 8, 2014

(86) PCT No.: PCT/US2014/050449
§ 371 (c)(1),
(2) Date: Feb. 5, 2016

(87) PCT Pub. No.: WO2015/021450
PCT Pub. Date: Feb. 12, 2015

(65) Prior Publication Data
US 2016/0197635 A1    Jul. 7, 2016

Related U.S. Application Data

(60) Provisional application No. 61/863,852, filed on Aug. 8, 2013.

(51) Int. Cl.
*H04M 1/00* (2006.01)
*H04B 1/3888* (2015.01)
*H04M 1/18* (2006.01)
*H04B 5/00* (2006.01)
*H04M 1/02* (2006.01)

(52) U.S. Cl.
CPC ......... *H04B 1/3888* (2013.01); *H04B 5/0037* (2013.01); *H04M 1/185* (2013.01); *H04M 1/0274* (2013.01)

(58) Field of Classification Search
CPC . H04B 1/3888; H01Q 1/243; H04M 1/72522; H04M 1/0214
USPC ........................ 455/575.8, 575.1, 90.3, 556.1
See application file for complete search history.

(56) References Cited

U.S. PATENT DOCUMENTS

| | | | | |
|---|---|---|---|---|
| 9,319,502 B2* | 4/2016 | Ueno | ...................... | H04M 1/21 |
| 2008/0032758 A1* | 2/2008 | Rostami | ................. | A45C 11/00 |
| | | | | 455/575.8 |
| 2011/0287726 A1* | 11/2011 | Huang | ................. | H04B 1/3883 |
| | | | | 455/90.3 |
| 2012/0303520 A1* | 11/2012 | Huang | .................. | H01M 10/46 |
| | | | | 705/39 |
| 2012/0319500 A1* | 12/2012 | Beart | ..................... | G06F 1/1632 |
| | | | | 307/104 |
| 2014/0065948 A1* | 3/2014 | Huang | ................. | H05K 5/0086 |
| | | | | 455/7 |
| 2014/0104491 A1* | 4/2014 | Liu | ........................ | G03B 17/56 |
| | | | | 348/376 |
| 2015/0133204 A1* | 5/2015 | Ivanovski | ............ | H04B 1/3816 |
| | | | | 455/575.8 |
| 2015/0172431 A1* | 6/2015 | Huang | ................. | H04B 1/3888 |
| | | | | 455/556.1 |
| 2015/0180527 A1* | 6/2015 | Fathollahi | ............ | H04B 1/3888 |
| | | | | 455/575.8 |

(Continued)

*Primary Examiner* — Danh Le
(74) *Attorney, Agent, or Firm* — Mintz Levin Cohn Ferris Glovsky and Popeo, P.C.

(57) ABSTRACT

A system and apparatus including a non-device specific power or data source module coupled to an extension module to form a case to protect specific devices and methods of forming same.

12 Claims, 12 Drawing Sheets

(56) References Cited

U.S. PATENT DOCUMENTS

2016/0106370 A1* 4/2016 Filipovic .............. A61B 5/6898
                                                    340/870.07
2016/0131592 A1* 5/2016 Cooper ................. G01N 21/78
                                                    356/402

* cited by examiner

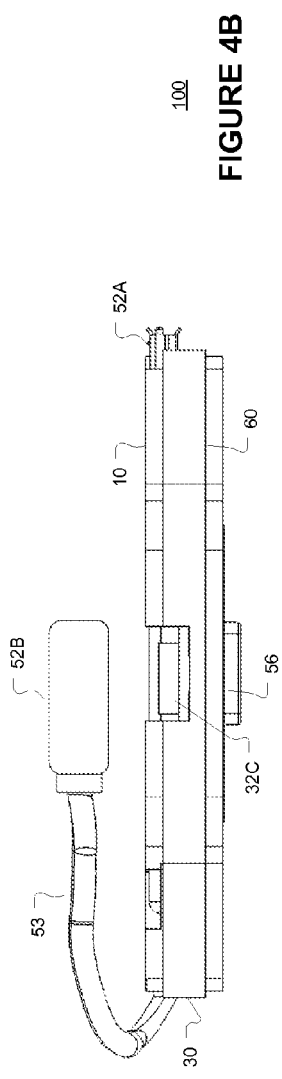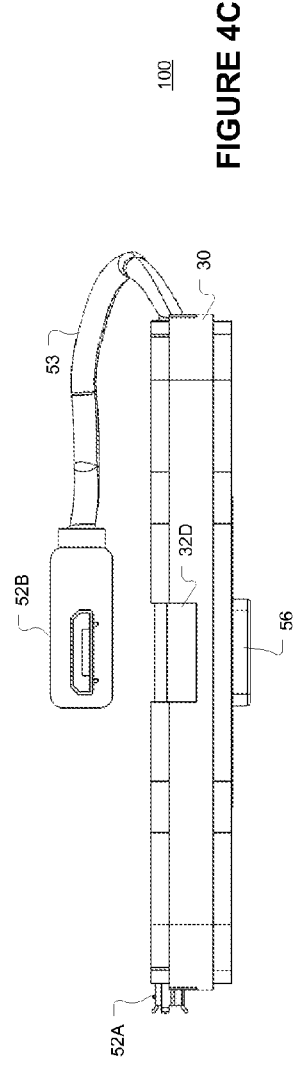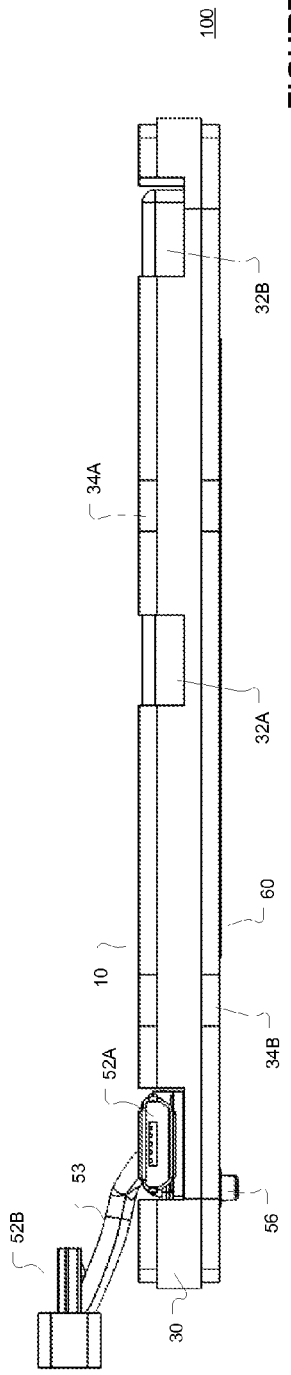

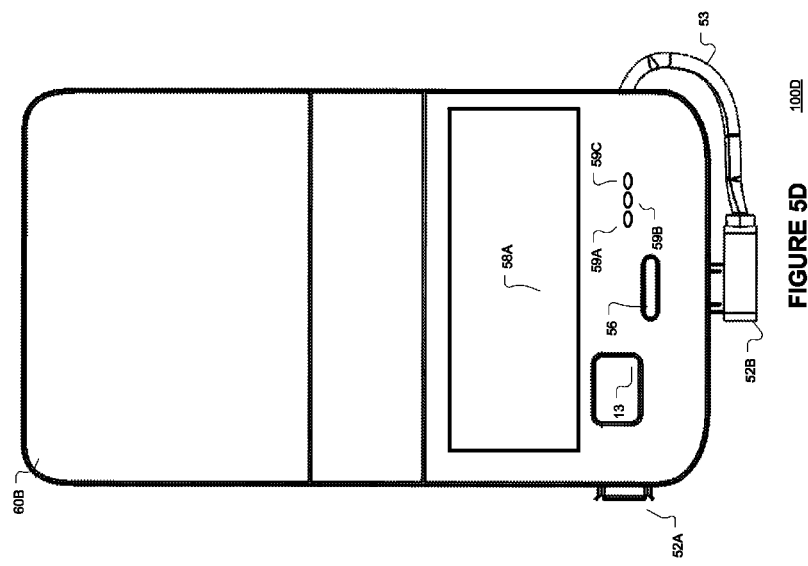
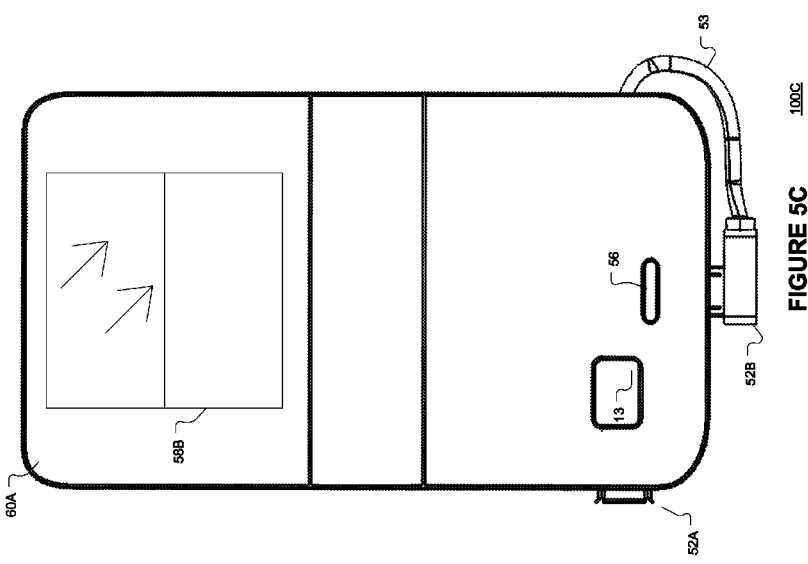

SYSTEM, APPARATUS AND METHOD FOR GENERIC ELECTRONIC DEVICE POWER MODULE AND CASE FORMATION

CROSS-REFERENCE TO RELATED APPLICATION SECTION

This application is a national-phase entry of Patent Cooperation Treaty Application No. PCT/US2014/050449, titled "SYSTEM, APPARATUS AND METHOD FOR GENERIC ELECTRONIC DEVICE POWER MODULE AND CASE FORMATION," which has an international filing date of Aug. 8, 2014, which claims priority to United States Provisional Patent Application No. 61/863,852, titled "SYSTEM, APPARATUS AND METHOD FOR GENERIC ELECTRONIC DEVICE POWER MODULE AND CASE FORMATION," which has a filing date of Aug. 8, 2013, the disclosures of which are incorporated by reference herein in their entirety.

TECHNICAL FIELD

Various embodiments described herein relate to apparatus for providing power or data with electronic devices via a device case that encloses and protects a portion of the device.

BACKGROUND INFORMATION

It may be desirable to provide a non-device specific power or data source module to be incorporated into a case that encloses and protects a specific device. The present invention provides modules, systems, methods, and apparatus for same.

BRIEF DESCRIPTION OF THE DRAWINGS

FIG. 4B is a bottom view diagram of a universal power source module without a front and rear cover according to various embodiments.

FIG. 4C is a top view diagram of a universal power source module without a front and rear cover according to various embodiments.

FIG. 4D is a side view diagram of a universal power source module without a front and rear cover according to various embodiments.

FIG. 5C is a rear view diagram of a universal power source module including a solar energy module according to various embodiments.

FIG. 5D is a rear view diagram of a universal power source module including an inductive charger module according to various embodiments.

DETAILED DESCRIPTION

Figure 1A:
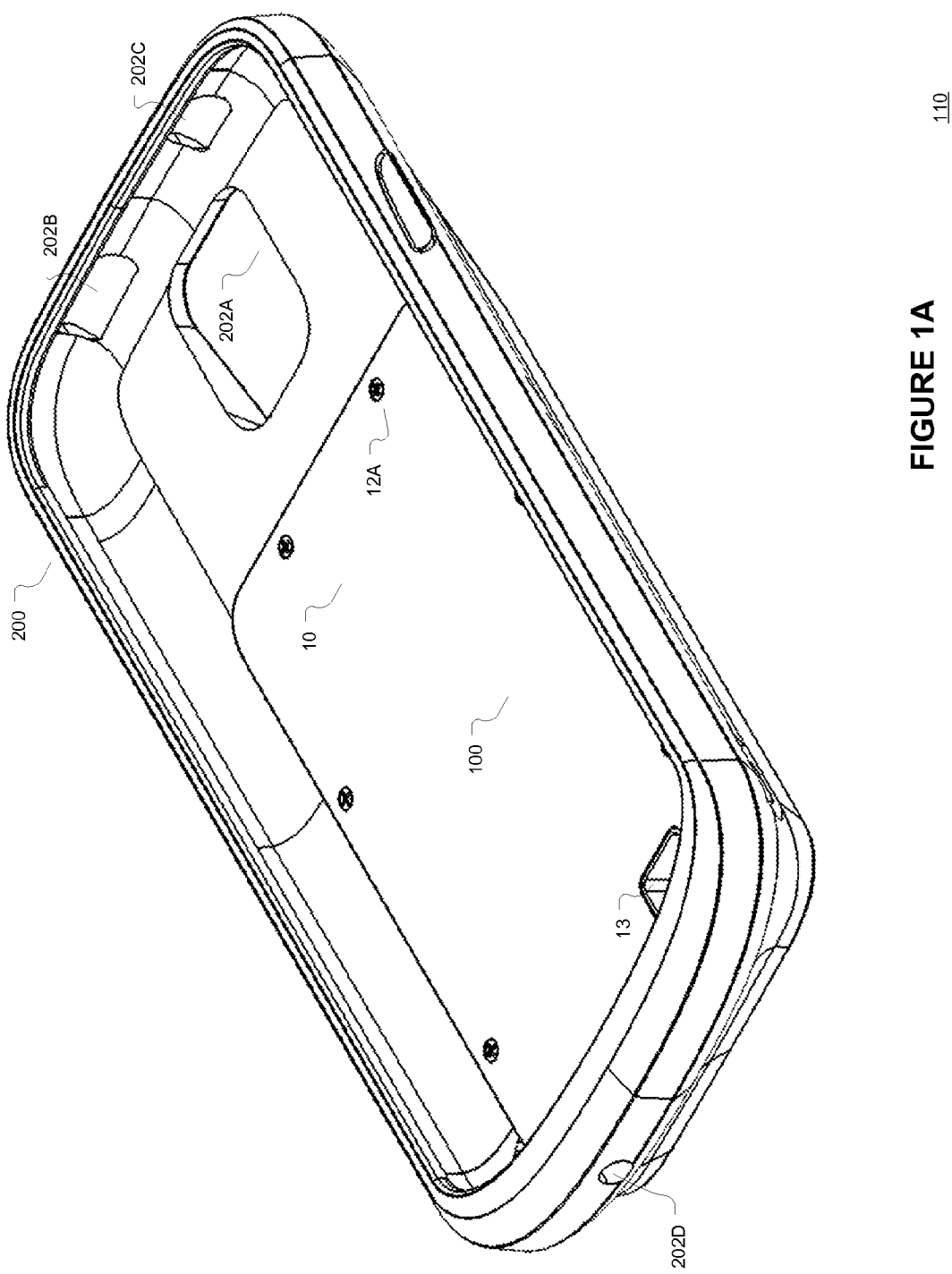
FIG. 1A is an isometric diagram of a device specific case system including a universal power source module and extension module according to various embodiments.
Figure 2:
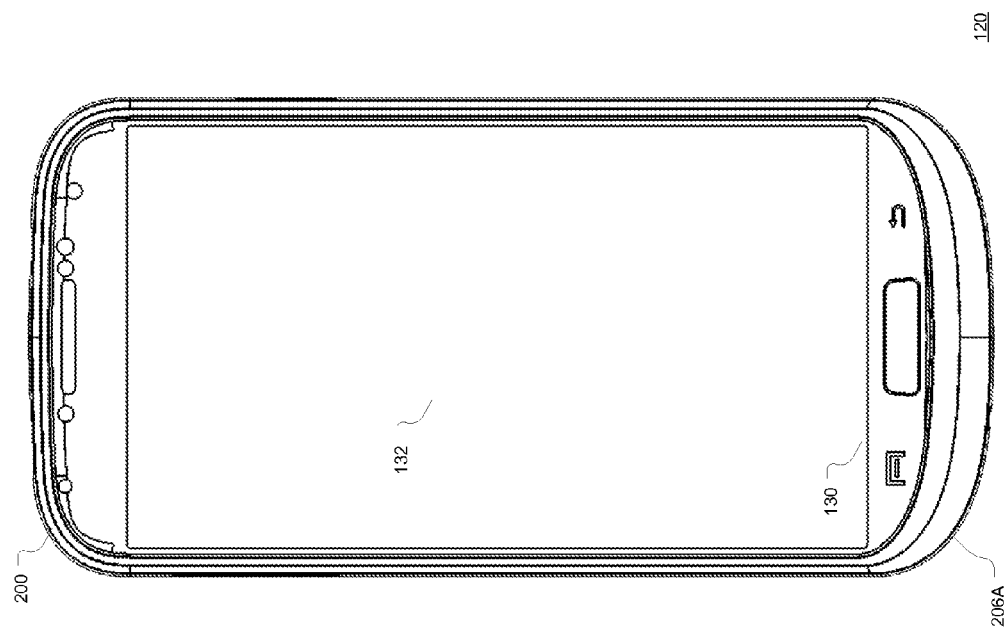
FIG. 2 is a front view diagram of case architecture including an electronic device coupled with a device specific case according to various embodiments.

FIG. 1A is an isometric diagram of a device specific power case system 110 including a universal power source module 100 and extension module 200 according to various embodiments. As shown in FIG. 1A, the device specific power case 110 includes universal power source module 100 and extension module 200. In an embodiment, the power case system 110 is shaped and sized to encase at least a portion of a specific electronic device (130, FIG. 2). In an embodiment the electronic device may be a cellular phone. The specific electronic device 130 shown in FIG. 2 may be a cellular phone have a screen 132 and various device elements (camera, microphone, headset jack, energy communication devices (infrared, near field communication (NFC)) that require an openings 202A, 202B, 202C, 202D, 13 to enable the device specific element to communicate signals without impeding desired performance.

Figure 1B:
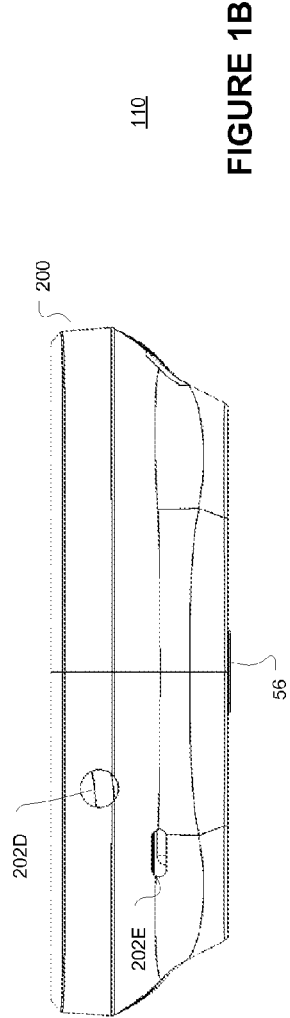
FIG. 1B is a bottom view diagram of a device specific case system including a universal power source module and extension module according to various embodiments.

In an embodiment, the universal power source module (UPSM) 110 may provide off grid electrical energy to an electronic device 130 coupled to the system 110 via an interface 52B (FIG. 1B) and be capable of using energy from outside source to charge an internal electrical energy storage module 40 and provide energy to the coupled electronic device 130 via an interface 52B (FIG. 1B). The UPSM 110 may be sized to not interfere with most if not all device specific elements for a variety of similar electronic devices currently on the market and distributed in the future. Most similar electronic devices have a minimal footprint and include few or no device specific communication elements on their rear or back section. The UPSM 100 may be sized to be located on the rear portion of most electronic devices while not interfering or blocking device specific elements that may not function properly when blocked.

Electronic device shape, size, and electronic elements, number and location may change with each iteration of the device or introduction of new model or provider/manufacturer. Such electronic device 130 modifications may require the overall case 110 dimensions and device specific element openings 202A to be changed. In an embodiment, the UPSM 100 dimensions may remain constant and the molded phone case extension module 200 may be modified to support different electronic devices and their device specific elements. In an embodiment, the molded phone case extension module 200 may be formed from one or more moldable materials including silicon, thermoplastic polyurethane (TPU), elastomers, polymers, carbon fibers, fiberglass, sintered metals or other formable materials.

FIG. 1B is a bottom view diagram of a device specific case system 110 including a universal power source module 100 and extension module 200 according to various embodiments. As shown in FIG. 1B, the extension module 200 may include one or more device specific openings 202D, 202E. In an embodiment, the UPSM 100 may include a power and status button 56 on the rear panel 60 (FIG. 1E). The power and status button 56 may enable a case user to activate the backup power source to provide power to a coupled electronic device 130 and determine external power status and electrical energy storage element 40 charge level or status.

Figure 1C:
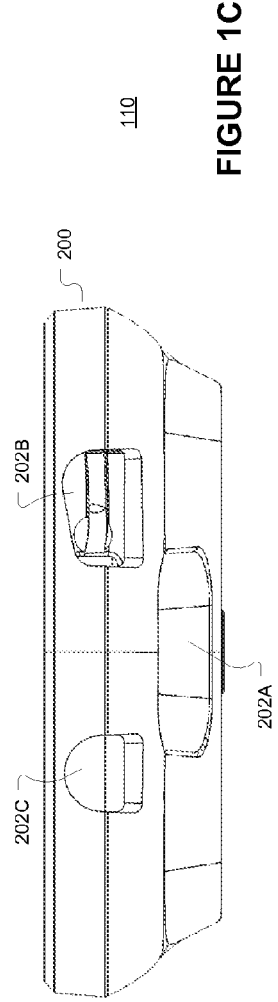
FIG. 1C is a top view diagram of a device specific case system including a universal power source module and extension module according to various embodiments.

FIG. 1C is a top view diagram of a device specific case system 110 including a universal power source module (UPSM) 110 and extension module 200 according to various embodiments. As shown in FIG. 1C, the extension module 200 may further include additional device specific openings 202B, 202C, and 202A. In an embodiment, the openings may correspond to a device headset jack or port, infrared transmitter, and camera with flash for the electronic device 130. In an embodiment, the electronic device may be a Samsung® cellular phone model Galaxy S4®. As noted the extension module 200 may be configured or changed to at least partially encase a mobile electronic device and enable access to various device specific elements.

Figure 1D:
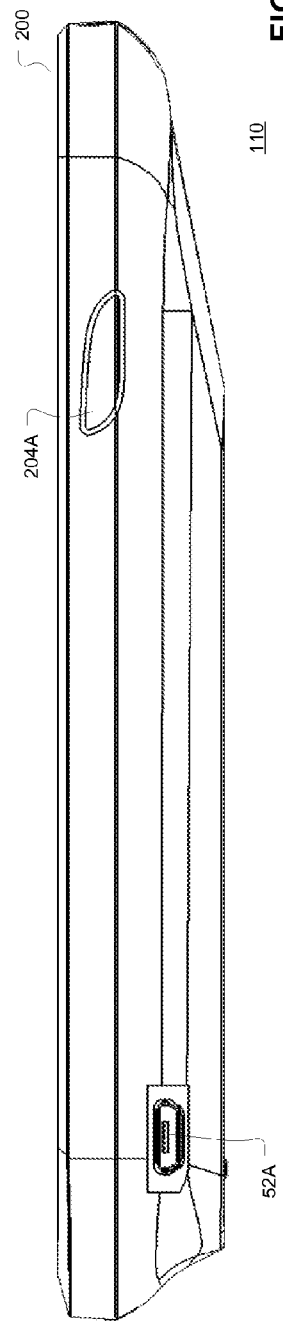
FIG. 1D is a side view diagram of a device specific case system including a universal power source module and extension module according to various embodiments.
Figure 1E:
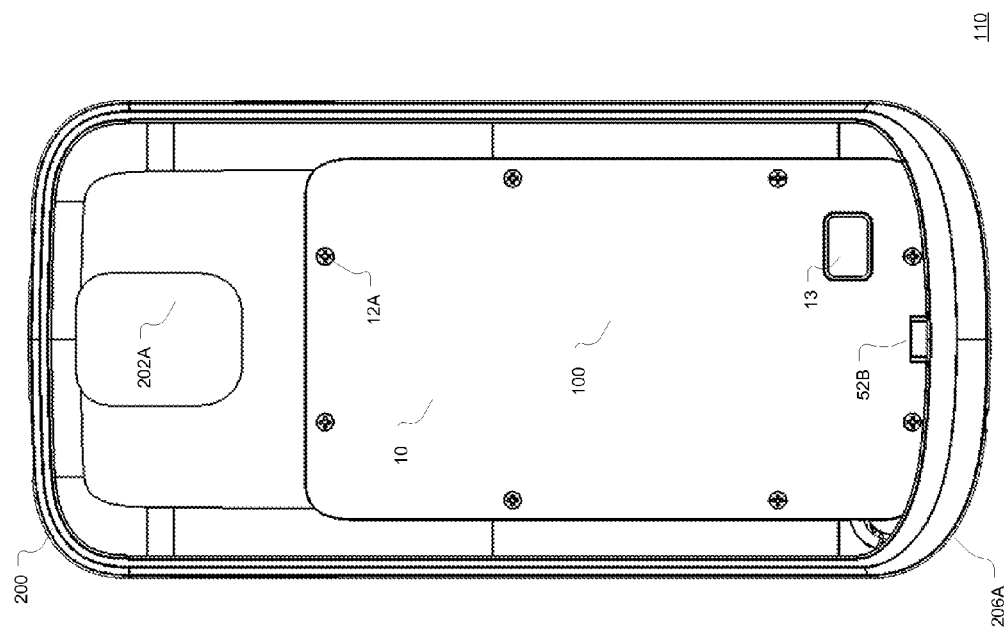
FIG. 1E is a front view diagram of a device specific case system including a universal power source module and extension module according to various embodiments.
Figure 4A:
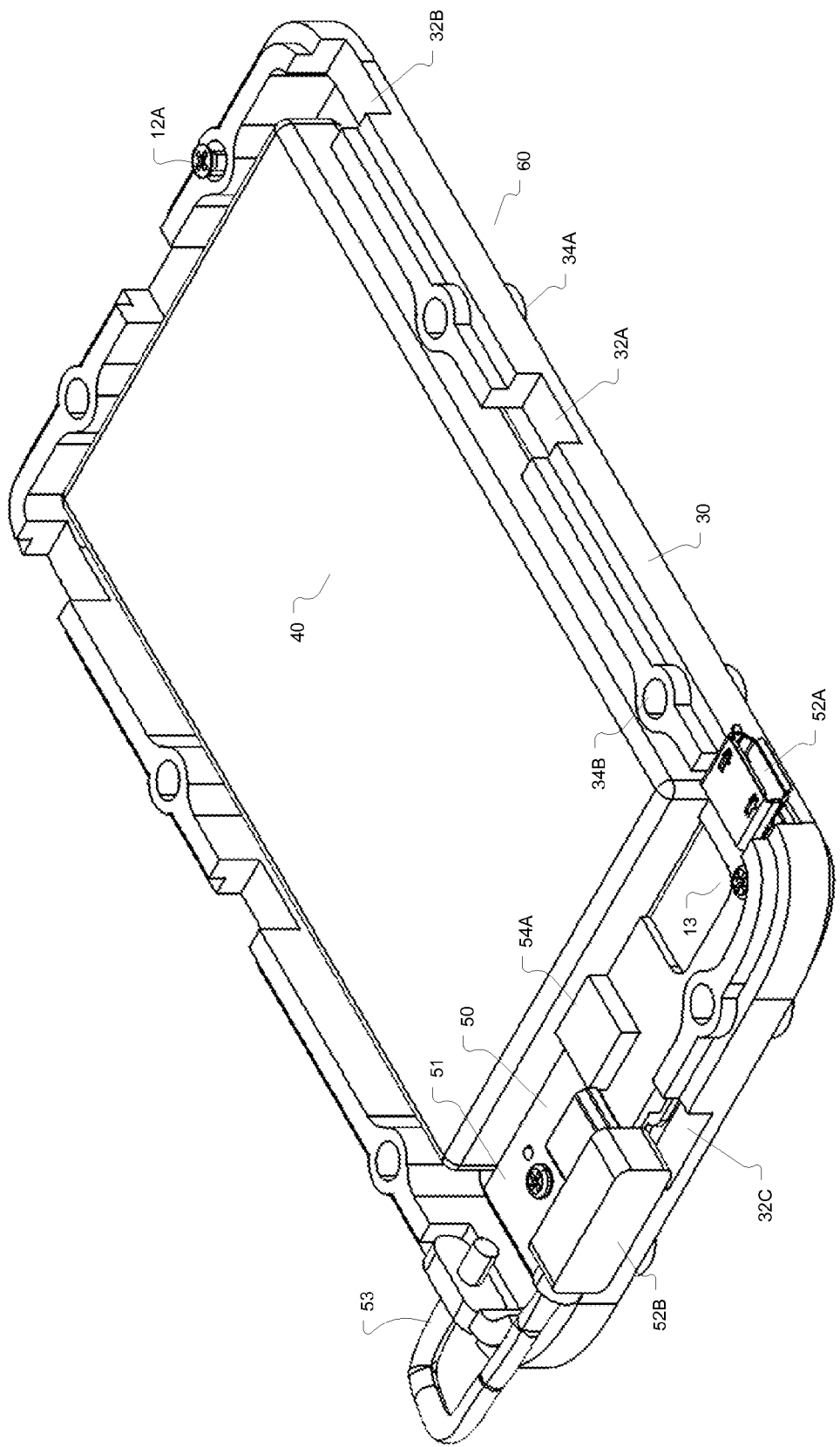
FIG. 4A is an isometric diagram of a universal power source module without a front and rear cover according to various embodiments.

FIG. 1D is a side view diagram of a device specific case system 110 including a universal power source module 100 and extension module 200 according to various embodiments. As shown in FIG. 1D, the extension module 200 may include a deformable button 204A to engage a device specific element such a power button or volume control. The UPSM 100 may include an external power and data connector (EPDC) 52A and the extension module 200 may include an opening 202G for the external power and data connector 52A. In an embodiment the connector 52A may be a power only connector or a data and power connector. In an embodiment the connector 52A may be a universal serial bus (USB) female connector including micro-USB or mini-USB. As shown in FIG. 4A the EPDC 52A may be coupled to a control module 50. The control module 50 may also be coupled to an internal power and data connector (IPDC) 52B and an electrical energy storage element (EESE) 40. In an embodiment, the EESE 40 may be any device capable of storing and discharging electrical energy including a capacitor or battery. The EESE 40 may also be universal and usable by various electronic devices. In an embodiment the EESE 40 may be a under writers (UL) and Cellular Telecommunications and Internet Association (CTIA) (IEEE 1725) certified battery having a storage capacity from 800 mAh (milli-Ampere-Hours) to 3000 mAh and 1500 mAh to 2100 mAh.

In an embodiment the EPDC 52A may be a micro USB type A or B device and include five contacts. The EPDC 52A may receive a DC powered signal on the power contacts having a voltage level of about 4.45 to 5.25 volts (5 volts nominally) and current from about 100 mA to 900 mA. The EPDC 52A may also communicate data via the data pins. In an embodiment, the control module 50 may monitor power and data signals received on the EPDC 52A. When the received power level is sufficient and an electronic device 130 is coupled to the control module 50 via the IPDC 52B, the control module may provide power signals to the electronic device 130. The control module 50 may also use a power signal received on the EPDC 52A to charge or maintain a charge level in the EESE 40. The control module 50 may prioritize power delivery to the coupled electronic device 130 versus the EESE 40 when a power signal is present on the EPDC 52A. In an embodiment, the control module 50 may also receive a power signal or electrical energy from a solar panel (58A FIG. 5C) located on the UPSM 100C rear cover or section 60A (FIG. 5C). The control module 50 may use power received from the solar panel 58B to provide a power signal to the electronic device 130 (when coupled to the control module 50 via the IPDC 52B) and to charge or maintain the EESE 40.

Figure 5A:
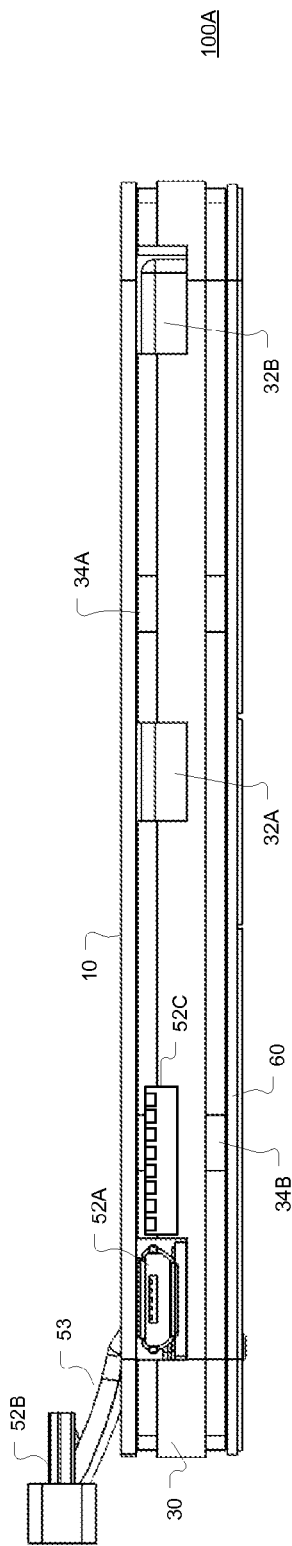
FIG. 5A is a side view diagram of a universal power source module including a memory interface module according to various embodiments.
Figure 5B:
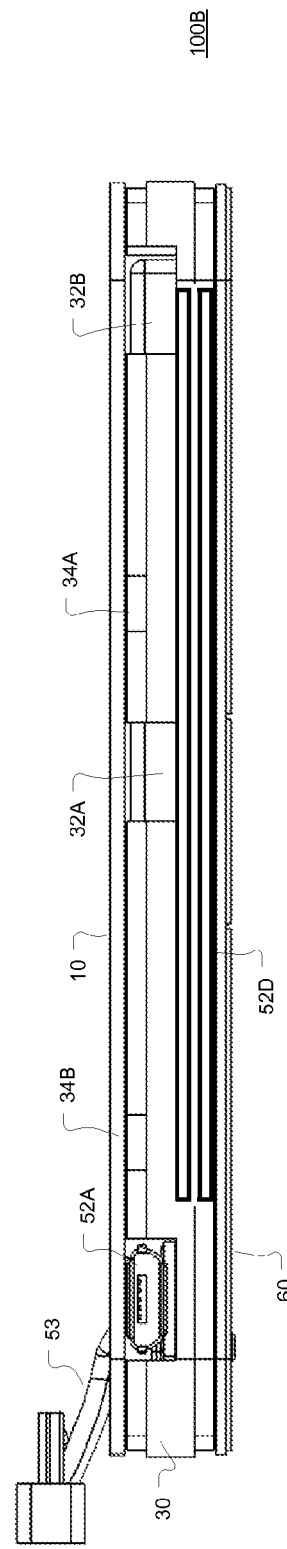
FIG. 5B is a side view diagram of a universal power source module including a magnetic card reader module according to various embodiments.

When the power signal received from the EPDC 52A and solar panel 58B is not sufficient for a coupled electronic device 130, the control module 50 may direct energy from the EESE 40 to the coupled electronic device 130. In an embodiment, the control module 50 may include a printed circuit board 51 (FIG. 4A). The PCB 51 may include a central processor or application specific integrated circuit (ASIC) 54A and electrical connections to the EESE 40, the EPDC 52A, the IPDC 52B, the solar panel 58B, the inductive charger module 58A (FIG. 5D), the memory interface module (MIM) 52C (FIG. 5A), and the magnetic card reader module (MCRM) 52D (FIG. 5B). As shown in FIG. 5D in an embodiment, a UPSM 100D may include an inductive charging module 58A that enables a user to provide energy inductively to the electronic device case system 110 when the inductive charging module 58A is located within a required proximity to a inductive energy source.

As shown in FIG. 5A, a UPSM 100A may also include a MIM 52C. The MIM 52C may interface with one or more memory devices including a compact flash card, secure digital (SD), miniSD, microSD, SD high capacity (SDHC), miniSDHC, microSDHC, SD extended capacity, and memory stick. The MIM 52C may conform to the SD input-output (SDIO) standard to enable a data memory card and other devices to communicate electronic data with via a coupled electronic device 130. In an embodiment, the ASIC 54A may also include an internal memory module where the electronic data may be communicated with a coupled electronic device 130 and IPDC 52B and another electronic device via the EDPC 52A.

As shown in FIG. 5B, a UPSM 100B may also include a magnetic card reader module (MCRM) 52D. The MCRM 52D may be able to read magnetic information stored on magnetic strip of a card. The control module 50 may communicate the magnetic card stored information with a coupled electronic device 130 via the IPDC 52B. The electronic device 130 may be provided with or include an application that enables the electronic device 130 to communicate data signals with the control module 50 including data signals from the EPDC 52A, MIM 52C, MCRM 52D and ASIC 54A internal memory module. As noted, the control module 50 may communicate data between the electronic device 130 and the EPDC 52A via the IPDC 52B. In an embodiment, the control module 50 may support USB 1.0, 2.0, and 3.0 and the data rate communicated by the control module 50 may vary from 1.5 Mbits to 5.0 Gbits depending on the devices coupled to the EPDC 52A and IPDC 52B.

FIG. 1E is a front view diagram of a device specific case system 110 including a UPSM 100 and coupled extension module 200 according to various embodiments. As shown in FIG. 1E, the UPSM 100 may be located in the lower, middle section of the system 110 where the system 110 is shaped and sized to be coupled to the rear of a handheld portable electronic device 130. It is noted that a portable, handheld, electronic device is less likely to device specific elements on their bottom rear section that become inoperable when placed adjacent a user's hand or the UPSM 100. As noted, some electronic devices 130 may intentionally include a device specific element on the bottom rear section for security reasons, requiring a user to consciously hold the device 130 in precise manner to employ or active such a located device specific element. In an embodiment the electronic device 130 includes a communication module on the bottom rear, such as an NFC module. In such an embodiment, the UPSM 100 may include portal or fenestration 13 to be located over the device specific element so the element will function when the electronic device 130 is coupled to the electronic device case system 110.

The extension module 200 is coupled to the UPSM 100 and together form a case that includes opening for device specific elements, electrical connector located to be operatively engage a device power-data interface and the rear section of the portable, handheld, electronic device 130. As shown in FIG. 1E, the extension module 200 may include an opening 202A on upper rear section that may coincide with a device 130 specific element (camera and flash for a specific device). The UPSM 100 may include the fenestration 13 and IPDC 52B where the IPDC 52B is located at the bottom rear section to engage a mating connector for a specific device. As shown in 4A, the IPDC 52B is coupled to the PCB 51 via a cable 53. The IPDC 52B may be moved to other locations to correspond the specific device mating connector location (such as on the right side, left side, bottom left, bottom right, and bottom middle.) As shown in FIGS. 3A-4F, the UPSM 100 may include a rigid frame 30, a front cover 10, and a rear cover 60.

The front cover 10 may be coupled to the rear cover 60 via one or more retaining elements 12A passing through retaining element fenestrations 34A. In another embodiment, one of the front cover 10 and the rear cover 60 may be integrally formed with the frame 30. The covers 10, 60, and frame 30 may be formed of more rigid materials than the extension module 200 in an embodiment. In an embodiment, the covers 10, 60, and frame 30 may be formed of similar materials as the extension module 200. In a further embodiment, a cover 10, 60 may be formed of a different material than the frame 30. In an embodiment the frame may be formed from polymers, metals, alloys, and other at least semi-rigid materials. The covers 10, 60 may be formed or polymers, metals, alloys, elastomers, TPU, silicon, or other materials that may or not be semi-rigid. As shown in FIGS. 3A-4F, the frame 30 may include multiple notches 32A to 32C that configured to securely couple the extension module to the frame 30. In another embodiment the frame 30 may glued or electronically seamed to the extension module as a function of their respective materials.

Figure 6:
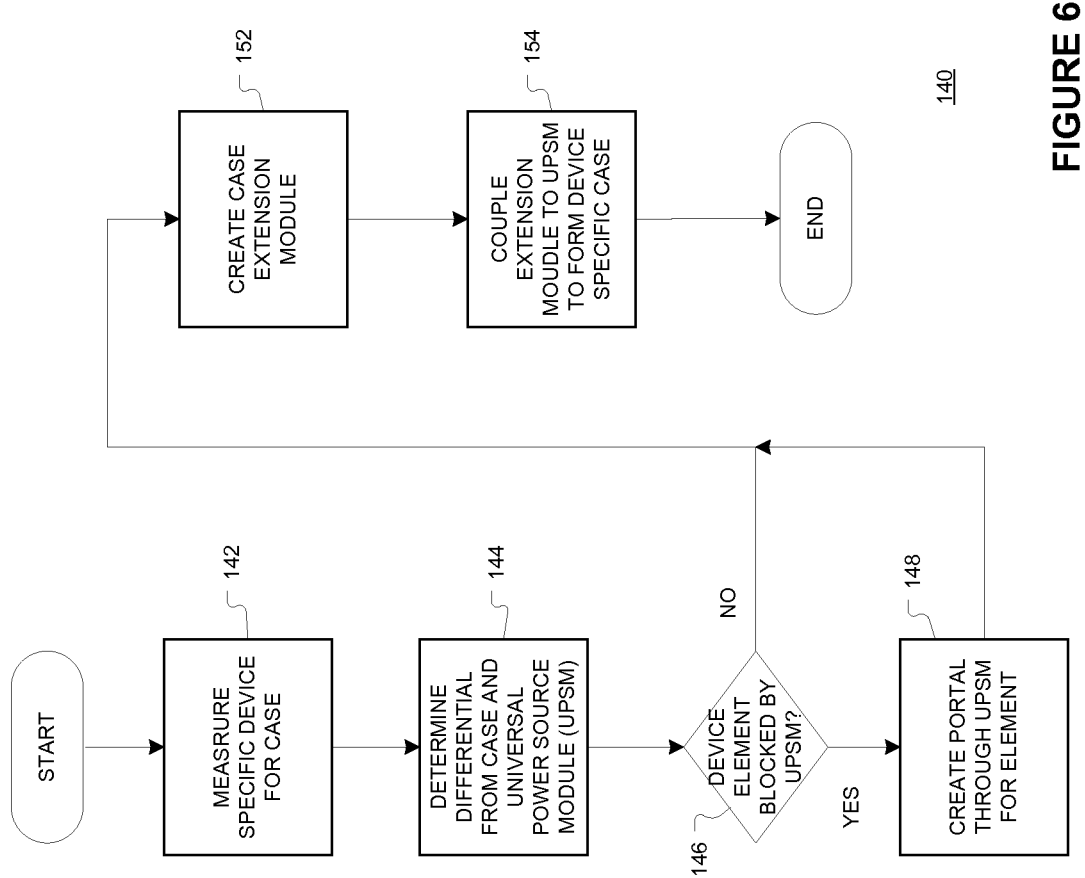
FIG. 6 is a flow diagram illustrating methods according to various embodiments.

To create or design a new case system 110 for a specific device 130, a user may employ the algorithm 140 shown in FIG. 6. As shown in FIG. 6, a new specific device 130 may be measured for a case (activity 142). Then the size differential between the UPSM 100 and the new case to be formed for the specific device, where the differential may represent the sizing and shape for the extension module 200 may be determined (activity 144). When the specific device 130 has an element that may not function properly and must be located behind the UPSM 100, a fenestration 13 may be created in the UPSM (activities 146, 148). Then, based on the specific device measurements and the differential from the UPSM 100, an extension module 200 may be created (activity 152). Thereafter the extension module 200 may be securely coupled to the UPSM 100 to form the device specific case system 110. In an embodiment, the algorithm 140 may also locate or determine the position of the IPDC 52B based on the location of the corresponding interface in the specific device 130.

Figure 3A:
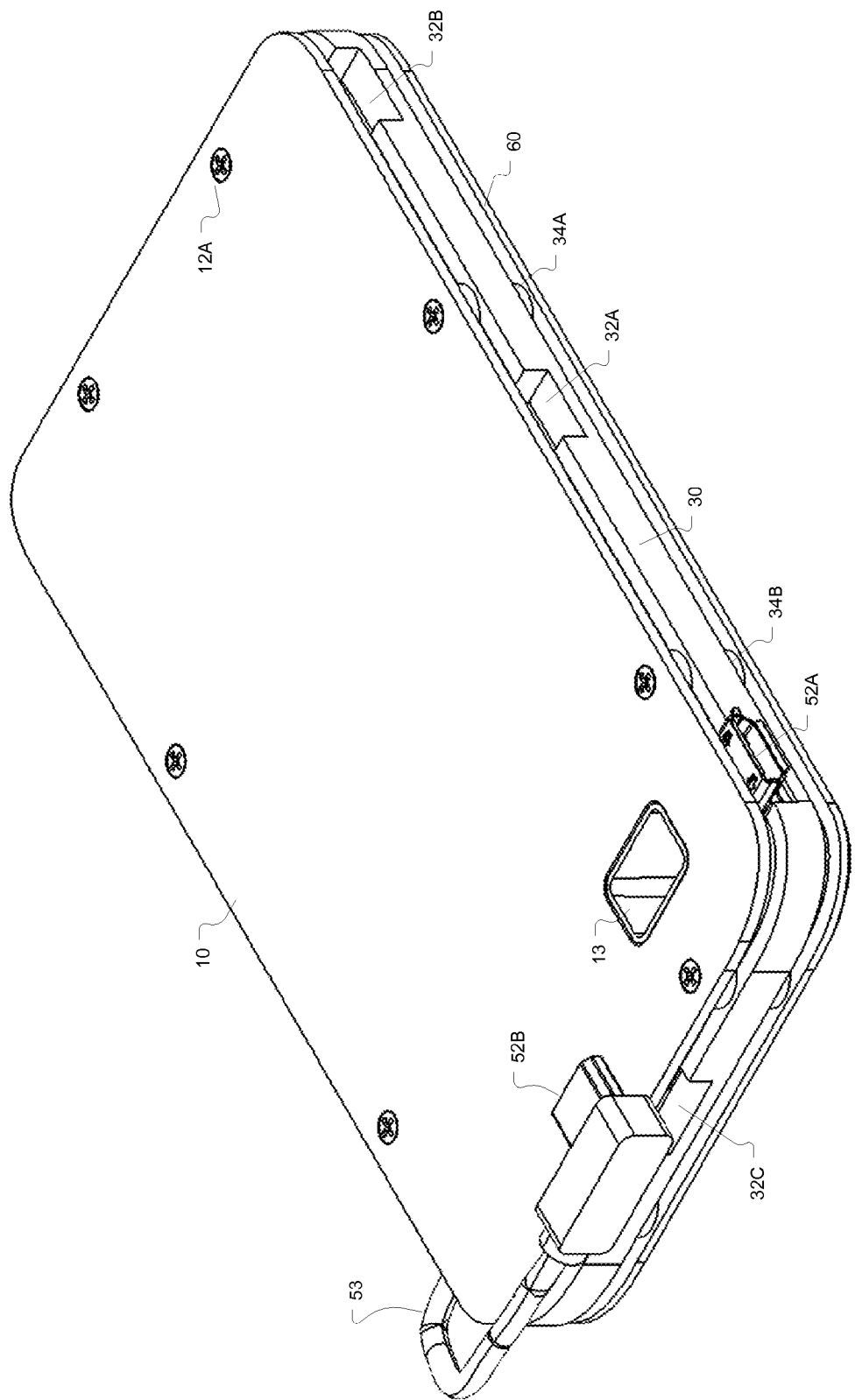
FIG. 3A is an isometric diagram of a universal power source module according to various embodiments.
Figure 3B:
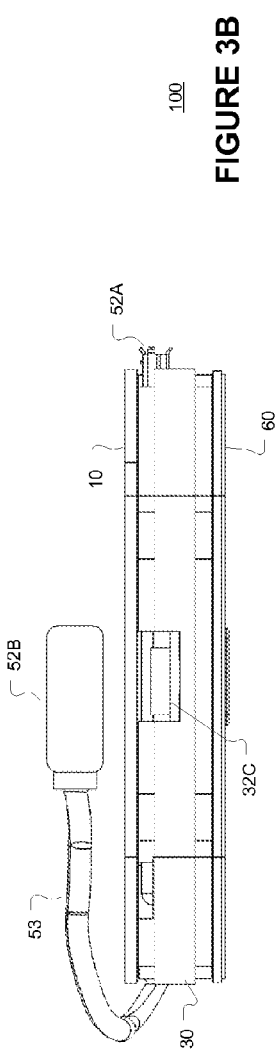
FIG. 3B is a bottom view diagram of a universal power source module according to various embodiments.
Figure 3C:
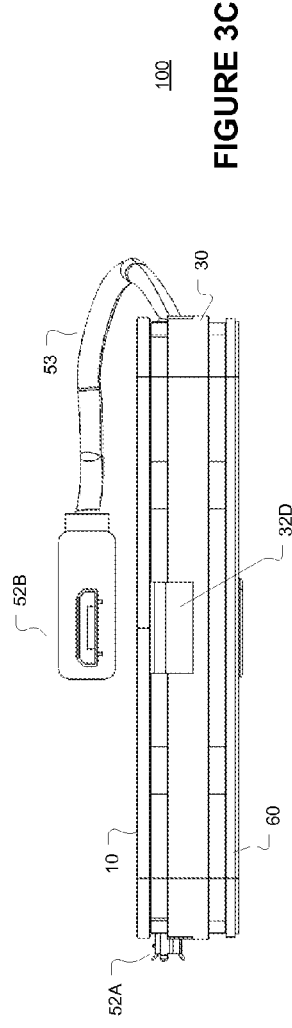
FIG. 3C is a top view diagram of a universal power source module according to various embodiments.
Figure 3D:
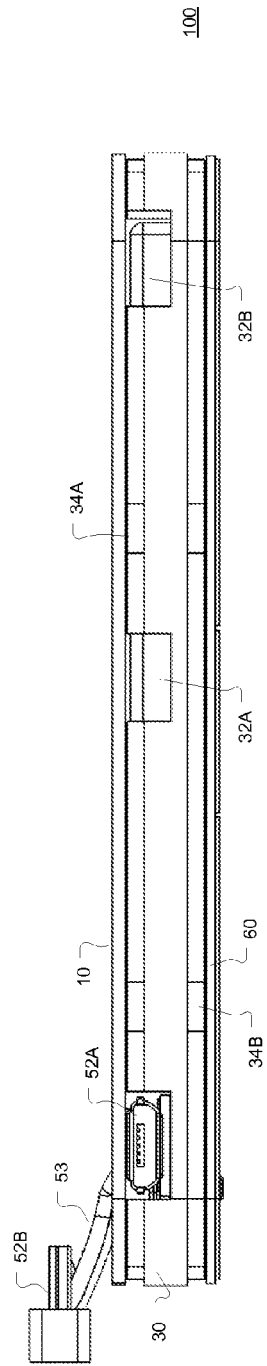
FIG. 3D is a side view diagram of a universal power source module according to various embodiments.
Figure 3F:
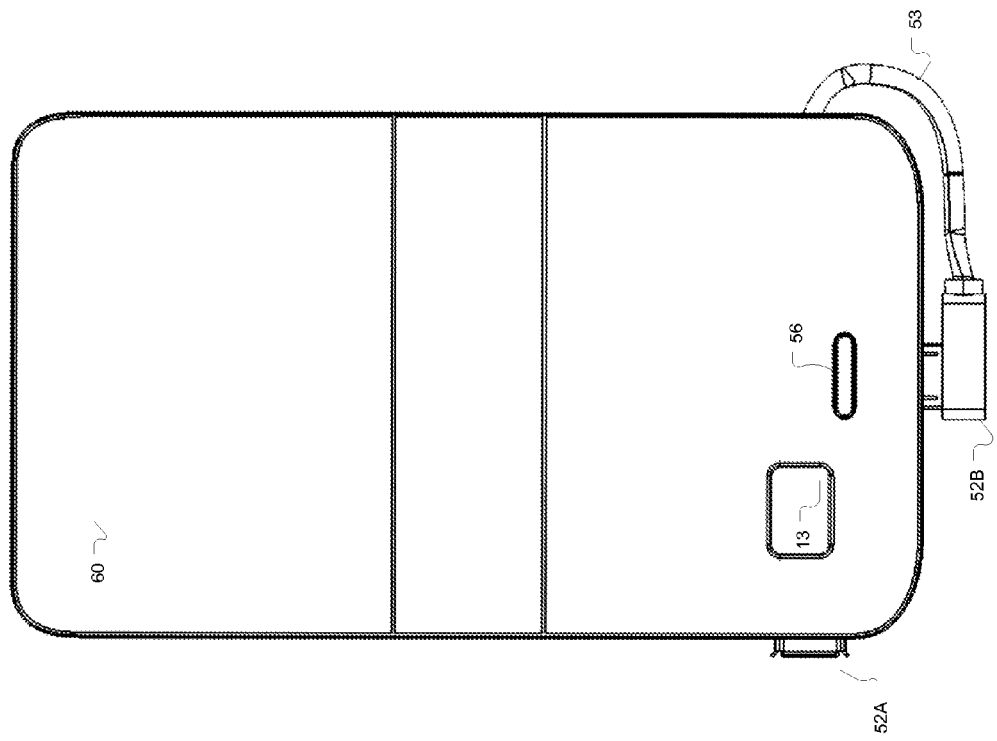
FIG. 3F is a rear view diagram of a universal power source module according to various embodiments.
Figure 3E:
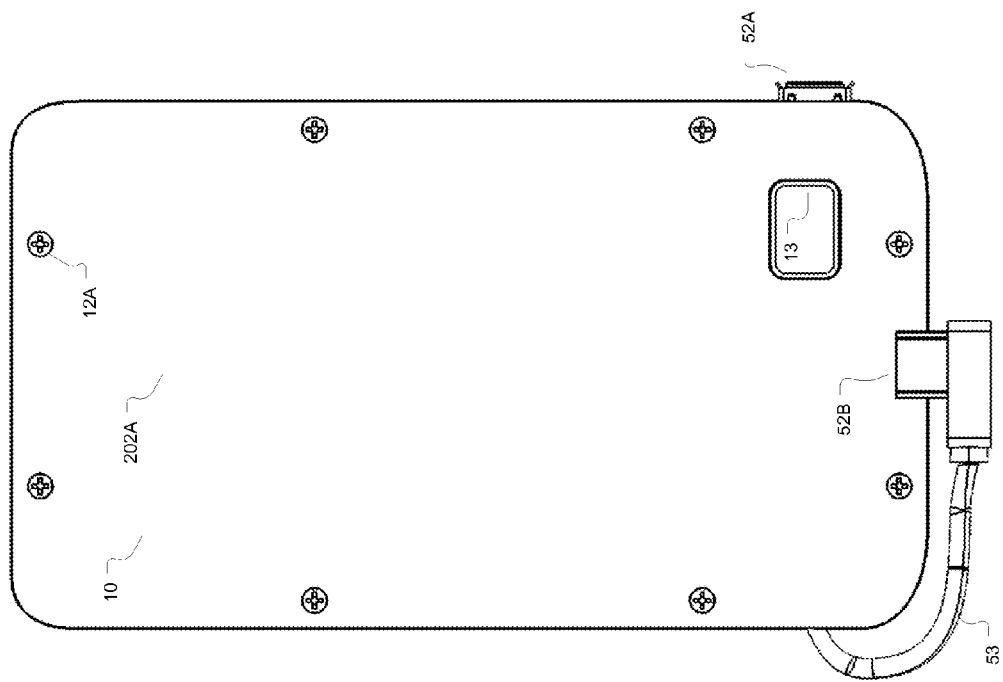
FIG. 3E is a front view diagram of a universal power source module according to various embodiments.

FIG. 3A is an isometric diagram of a universal power source module 100 according to various embodiments. FIG. 3B is a bottom view diagram of a universal power source module 100 according to various embodiments. FIG. 3C is a top view diagram of a universal power source module 100 according to various embodiments. FIG. 3D is a side view diagram of a universal power source module 100 according to various embodiments. FIG. 3E is a front view diagram of a universal power source module 100 according to various embodiments. FIG. 3F is a rear view diagram of a universal power source module 100 according to various embodiments. As shown in FIGS. 3A-3F, the EPDC 52A may located on the right bottom corner in an embodiment and the IPDC 52B may be located in the extension module 200 to mate with the specific device interface. In an embodiment, the IPDC 52B may be a micro-usb interface and the specific device 130 may mating micro-USB interface. As shown in FIGS. 3A-3F, the UPSM 100 frame 30 may include multiple notches 32A to 32D. The extension module 200 may be configured to include mating, reciprocal notches to enable the extension module 200 to securely engage the UPSM 100. As shown in FIG. 3F, the UPSM 100 may include a power button 56. In an embodiment the button 56 may also include multiple display elements. The elements may display different colors and intensity where the numbers of elements active, color, and intensity may indicate the EESE 40 charge status, external power status at interface EPDC 52A, and specific device status at interface IPDC 52B.

Figure 4F:
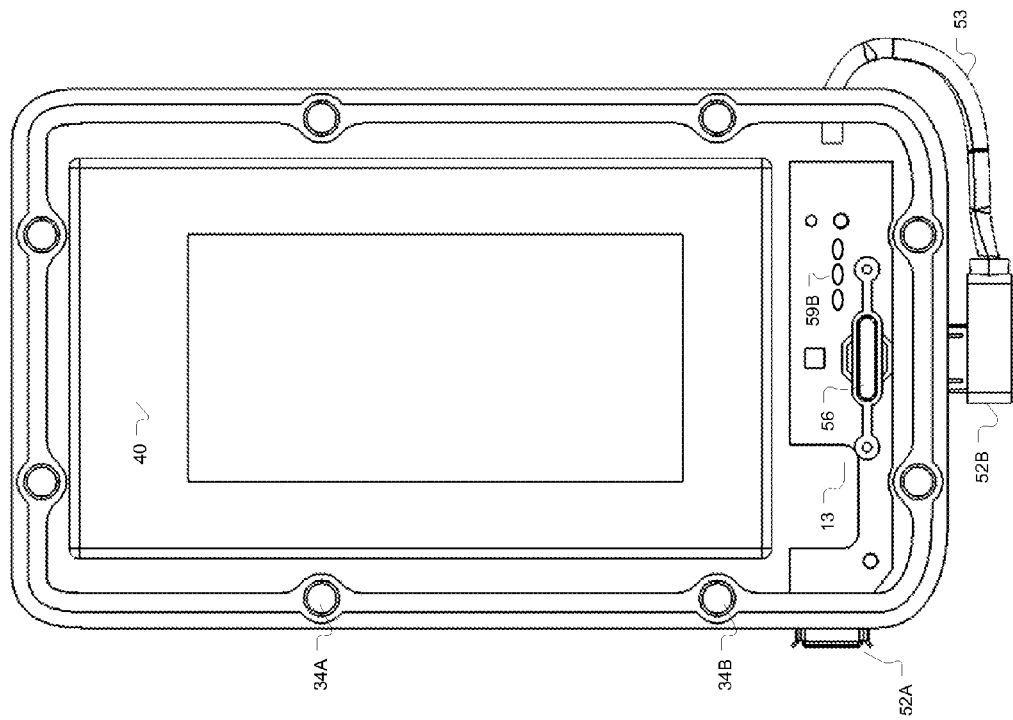
FIG. 4F is a rear view diagram of a universal power source module without a front and rear cover according to various embodiments.
Figure 4E:
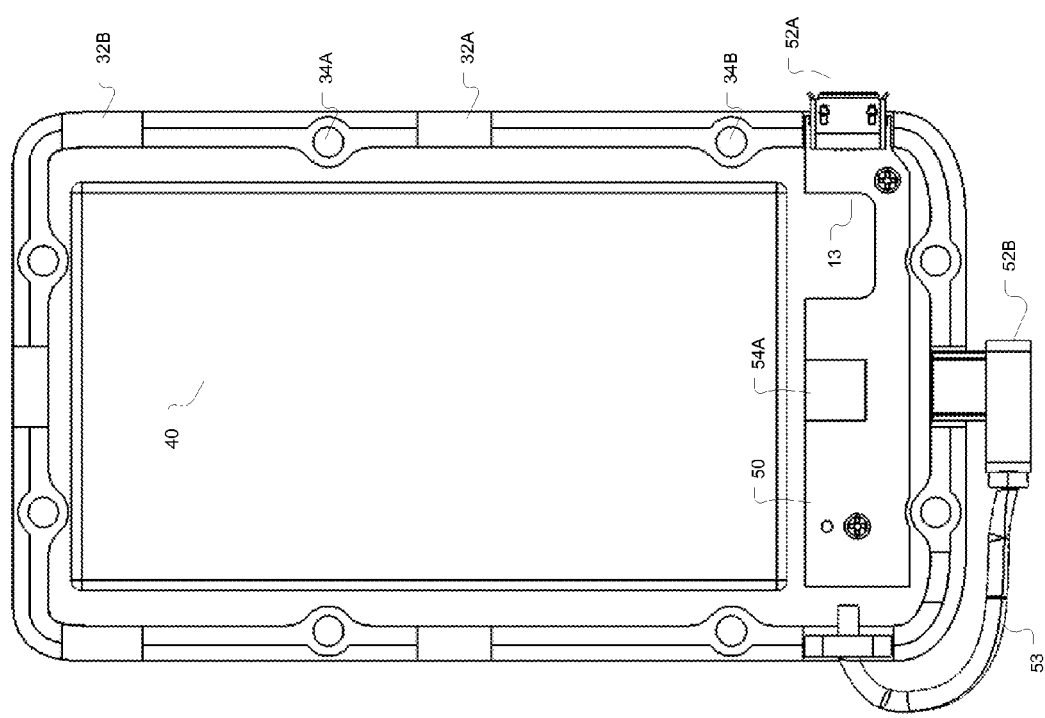
FIG. 4E is a front view diagram of a universal power source module without a front and rear cover according to various embodiments.

FIG. 4A is an isometric diagram of a universal power source module 100 without a front 10 and rear cover 60 according to various embodiments. FIG. 4B is a bottom view diagram of a universal power source module 100 without a front 10 and rear cover 60 according to various embodiments. FIG. 4C is a top view diagram of a universal power source module 100 without a front 10 and rear cover 60 according to various embodiments. FIG. 4D is a side view diagram of a universal power source module 100 without a front 10 and rear cover 60 according to various embodiments. FIG. 4E is a front view diagram of a universal power source module 100 without a front 10 and rear cover 60 according to various embodiments. FIG. 4F is a rear view diagram of a universal power source module 100 without a front 10 and rear cover 60 according to various embodiments. As shown in FIGS. 4A to 4F, the EESE 40 size (length, width, and depth) may be selected based on the desired energy storage capacity. The frame 30 dimensions may correspond to the EESE 40 dimensions, any needed device specific fenestrations 13, the control module 50 minimal dimensions, and the EPDC 52A dimensions. In an embodiment, the front and rear covers 10, 60 may be coupled to the frame via locking elements 12A including bolts or screws. In another embodiment, the front and rear covers 10, 60 may be coupled to the frame 30 via notches, glue, welds, or other securing devices.

The rear cover 60, 60A, 60B may include an opening for the fenestration 13 and button 56. In an embodiment, the UPSM 100D may include one or more light emitting diodes 59A, 59B, 59C as shown in FIG. 5D. The LEDs 59A, 59B, 59C may be mounted directly to the PCB 51 of the control module 50 (FIG. 4F). The rear cover 60B may include openings for fenestrations for the LEDs 59A-C. In an embodiment, there may be one or more LEDs 59A-C or an LED in the button 56. In an embodiment, there may be a single LED 59A that changes color, display rate, and intensity depending on the EESE 40 or the coupled device 130 charge status. In an embodiment, the LED may emit a green wavelength signal when the EESE 40 or device 130 is about 80 to 100% charged, a blue wavelength signal when the EESE 40 or device 130 is about 30 to 80%, and red wavelength signal when the EESE 40 or device 130 is less than 30% charged, and may blink red when the EESE 40 or device 130 is unable to hold a charge.

In an embodiment the control module 50 may start charging a coupled device 130 via the IPDC 52B when the power button 56 is held for a first predetermined time internal and discontinue charging the device when the button 56 is held for a second predetermined time internal. The first and second time intervals may be from 1 to 5 seconds or about 2 seconds in an embodiment. The control module 50 may stop charging a coupled device 130 via the IPDC 52B when its load is below a predetermined amperage for a predetermined time interval. In an embodiment, the predetermined amperage may be less from 100 mA to 10 mA and the time internal may be from 1 to 15 minutes or less than 60 mA for 10 minutes in an embodiment.

The modules described herein may include hardware circuitry, single or multi-processor circuits, memory circuits, software program modules and objects, firmware, and combinations thereof, as desired and as appropriate for particular implementations of various embodiments. The apparatus and systems of various embodiments may be useful in applications. They are not intended to serve as a complete description of all the elements and features of apparatus and systems that might make use of the structures described herein. It is noted that the case system 110 may be sized for larger electronic devices including tablets and the EESE 40 may be sized and have a larger capacity accordingly.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion. A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A portable case for providing power and device perimeter protection to a mobile device, the portable case comprising:
 a removable power source module; and
 an outer shell having a back side and a plurality of side walls, the outer shell sized and shaped to encase a mobile device and the removable power source module within an uppermost edge of the plurality of side walls, the removable power source module configured to provide power to the mobile device, the removable power source module comprising:

a frame, the frame including an outer perimeter smaller than an outer perimeter of the outer shell;

an electrical energy storage module, the electrical energy storage module storing and discharging electrical energy and sized to fit within the frame;

an input electrical energy interface configured to couple to an electrical energy power source that is external to the portable case;

an output electrical energy interface configured to provide electrical energy to the mobile device; and a control module sized to fit substantially within the frame and configured to control the provision of electrical energy, from one or more of the electrical energy storage module and the input electrical energy interface, to the output electrical energy interface.

2. The portable case of claim 1, wherein the control module includes a printed circuit board sized to substantially fit within the frame.

3. The portable case of claim 1, wherein at least one side wall of the plurality of side walls is at least partially deformable.

4. The portable case of claim 1, wherein the output electrical energy interface is a standardized electrical connector.

5. The portable case of claim 1, wherein the input electrical energy interface is a standardized electrical connector.

6. The portable case of claim 1, wherein the output electrical energy interface provides electrical energy inductively.

7. The portable case of claim 1, wherein the input electrical energy interface receives electrical energy inductively.

8. The portable case of claim 1, wherein the frame includes at least one notch on at least two sides and an internal side of the outer shell includes matching protrusions to engage the frame notches.

9. The portable case of claim 1, wherein the frame includes at least one notch on four sides and an internal side of the outer shell includes matching protrusions to engage the frame notches.

10. The portable case of claim 1, wherein the outer shell is formed of at least partially flexible material.

11. The portable case of claim 10, wherein the frame is formed of substantially rigid material.

12. The portable case of claim 1, wherein the removable power source module further comprises an aperture configured to be disposed adjacent a camera of the mobile device when the mobile device is engaged within the outer shell.

* * * * *